United States Patent [19]
Krolick

[11] Patent Number: 4,651,382
[45] Date of Patent: Mar. 24, 1987

[54] SOLVENT-BONDABLE PLASTIC PARTS WITH CAPILLARY-ACTION BLOCKING MOAT TO CONFINE SOLVENT FLOW

[76] Inventor: Robert S. Krolick, 9 Surrey La., San Rafael, Calif. 94903

[21] Appl. No.: 846,499

[22] Filed: Mar. 27, 1986

Related U.S. Application Data

[63] Continuation of Ser. No. 615,832, May 31, 1984, abandoned.

[51] Int. Cl.$^4$ .......................... E05D 5/00; B25G 3/00; B25G 3/34
[52] U.S. Cl. ........................................ 16/124; 16/382; 16/385; 16/DIG. 13; 156/305
[58] Field of Search .......................... 16/124, 380–383, 16/385–387, DIG. 13, DIG. 40; 156/71, 305; 428/156, 157

[56] References Cited

U.S. PATENT DOCUMENTS

| | | | |
|---|---|---|---|
| 3,107,389 | 10/1963 | Engelbrecht | 16/124 |
| 3,524,215 | 8/1970 | Kurtz | 16/124 |
| 3,703,742 | 11/1972 | Konishi | 16/385 |
| 3,805,327 | 4/1974 | Walker | 16/383 |
| 4,137,117 | 1/1979 | Jones | 156/305 X |
| 4,152,473 | 5/1979 | Layman | 156/305 X |
| 4,231,135 | 11/1980 | Fradin | 16/380 X |
| 4,329,758 | 5/1982 | Föhl | 16/385 X |

*Primary Examiner*—Fred Silverberg
*Attorney, Agent, or Firm*—David Pressman

[57] ABSTRACT

A plastic part has a broad surface area for solvent bonding to another plastic part; the bonding surface has a groove, recess, or non-dissolvable portion for restricting the solvent to a narrow marginal edge area for uniform distribution. In one embodiment, a plastic hinge (FIG. 2) and two hinged members (64,66) are pivotally interconnected by the leaves. Grooves (52, 54) are formed on the mating surface of hinge halves. These grooves define and isolate marginal portions (56, 58) on the faces of the leaves from inner portions (60, 62). The grooves act as barriers to prevent penetration of a solvent, used for bonding the hinge leaves to the two hinged members, from the inner support portions of the leaves. When the solvent is injected into the area of contact between the mating plastic parts from the outer edge of each hinge element, e.g., by a syringe, it wets and dissolves the marginal portions and the underlying areas of the two hinged members but is restricted to the marginal areas by the grooves. Thus a plastic hinge can be bonded without mechanical fasteners and provides aesthetic consistency with the hinged members. The marginal bonding area can also be isolated by means of a recessed inner portion (84) and the principle of the invention can be used for other solvent bonded elements with broad faces, such as drawer pulls (FIG. 7) and latches (FIG. 8).

14 Claims, 12 Drawing Figures

U.S. Patent  Mar. 24, 1987  Sheet 1 of 2  4,651,382
FIG 1 -- PRIOR ART
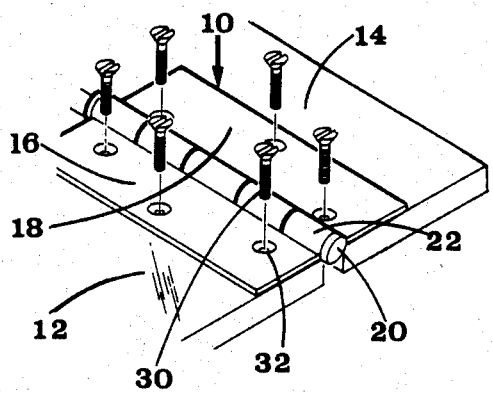
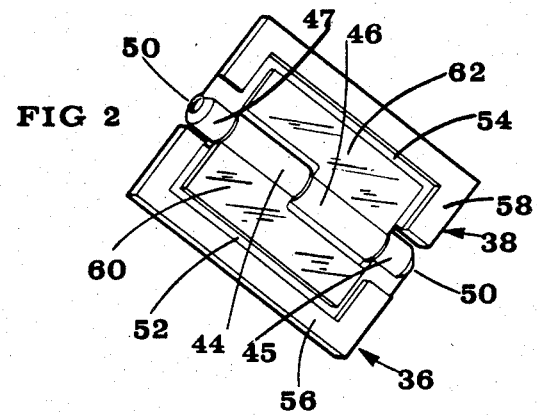
FIG 2
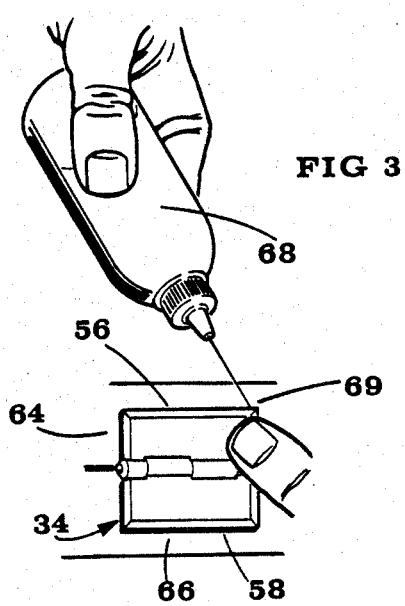
FIG 3
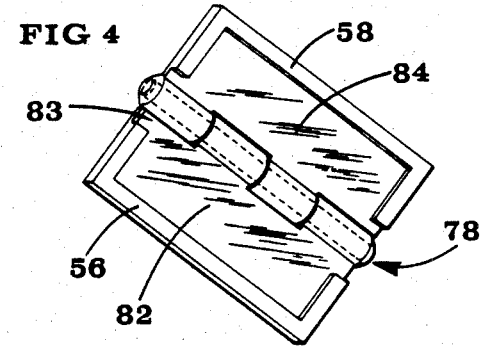
FIG 4
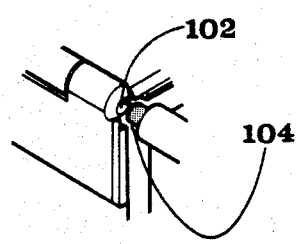
FIG 6 a
FIG 6 b
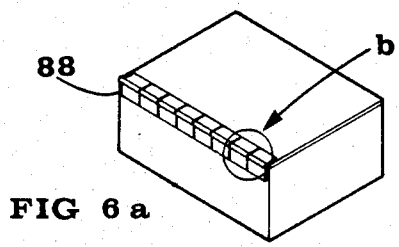
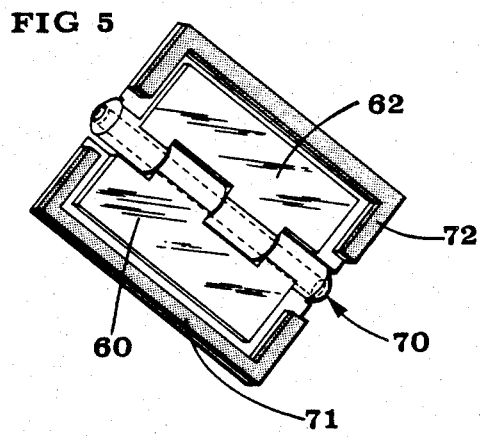
FIG 5

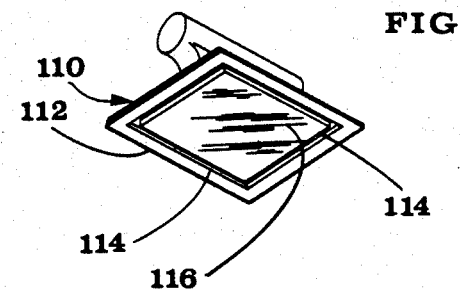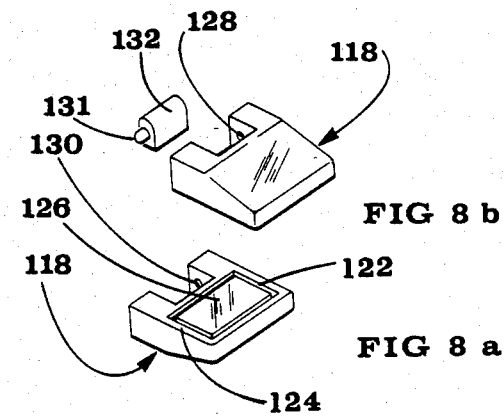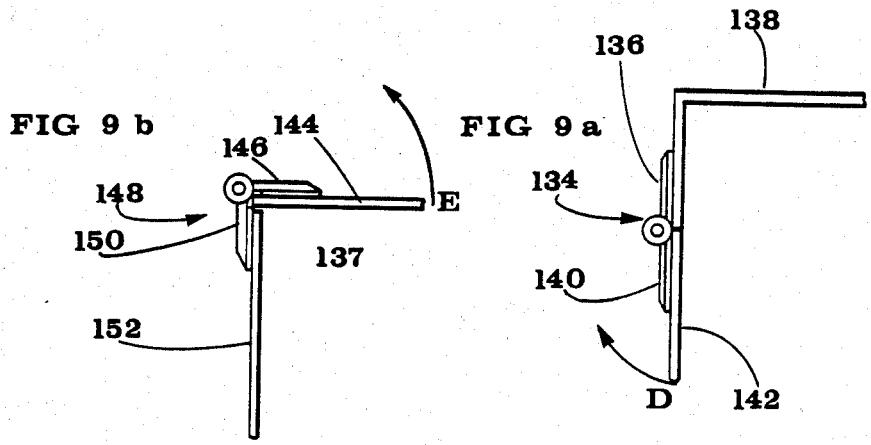

SOLVENT-BONDABLE PLASTIC PARTS WITH CAPILLARY-ACTION BLOCKING MOAT TO CONFINE SOLVENT FLOW

This is a continuation of application Ser. No. 615,832, filed May 31, 1984, now abandoned.

BACKGROUND—FIELD OF THE INVENTION

The present invention relates to the attachment of plastic parts having broad contact surfaces, particularly to the solvent attachment of plastic hinges, drawer or pull handles, latches, etc.

BACKGROUND—DESCRIPTION OF PRIOR ART

Nowadays a constantly increasing number of parts and articles are made of plastic. Plastic parts find use in all fields and industries, e.g., housings for electronic and measuring instruments, domestic appliances, packages for small items, drugs, toys, etc. Very often such articles and containers are made entirely of plastic, including drawers, covers, etc., and their handles, including pivotally connected parts, such as doors, covers, etc., and their hinges.

Heretofore metal handles or hinges were used on plastic parts; such metal handles or hinges were attached by mechanical fasteners, e.g., screws or rivets. The use of such metal hardware, however, entails a number of disadvantages, mainly increased weight, lack of clarity or transparency (which is important on applications that involve clear items, as in visual merchandising), susceptibility to rust or corrosion (which is a problem with laboratory or food-holding apparatus, or outdoor applications), additional labor consumption in manufacturing, the need for drilling and tapping holes, which themselves weaken the plastic parts, especially since the holes must be drilled near the edges thereof, concentration of stresses, and aesthetic inconsistency with the clarity of colorless plastic. Besides, metal parts, fasteners, and their holes act as sources of the stress concentration and may collect debris and breed bacteria—distinct disadvantages for containers used in the food industry. Moreover metal hinges require lubrication, a distinct disadvantages since oil also supports and collects bacteria.

Even if plastic parts were substituted for metal in the above applications, the use of metal fasteners would still be required. Even then, the resultant assemblies would have most of the above disadvantages. Also they would tend to fracture due to stress concentration from their fasteners. Plastic parts attached with a solvent method (described below) would theoretically eliminate most of the above disadvantages, but would provide a new disadvantage: the irregular capillary flow of solvent under the part would be highly unsightly with transparent parts, and the solvent flow could reach to undesirable areas, such as the knuckle of a hinge.

OBJECTS AND ADVANTAGES OF THE PRESENT INVENTION

Accordingly several objects of the present invention are to provide a means for attaching together—reliably, quickly, economically, and aesthetically—plastic parts with broad contact surfaces, e.g., pull handles to drawers or covers and plastic hinges to hingedly attached members. Other objects are to provide a means of attachment which is light in weight, transparent, corrosion-proof, free of stress-concentration sources, such as holes or rivets, aesthetically consistent with the clarity of colorless plastic, hygienically acceptable for food or laboratory applications, simple and economical to manufacture, and reliable, and practical in use. A further object is to provide a hinge which does not require lubrication and hence is highly suitable for food and laboratory use. Further objects and advantages are to provide solvent-attachable parts which have broad contact surfaces but which look neat after solvent attachment and in which solvent flow is restricted to desired areas. Additional objects and advantages will become apparent from a consideration of the ensuing description and drawings.

BRIEF DESCRIPTION OF DRAWINGS

FIG. 1 view illustrates a conventional method of attachment of a hinge to pivotally connected parts by means of metal fasteners.

FIG. 2 is a view of a hinge of the present invention employing an isolating groove.

FIG. 3 illustrates a method of application of a solvent onto the mating surfaces of such hinge and a hinged member.

FIG. 4 illustrates a hinge of the invention with an elevated marginal portion and uniformly-sized knuckle sections.

FIG. 5 illustrates a hinge of the invention with a special marginal portion.

FIG. 6a is a perspective view of a box with a lid attached by a piano hinge according to the invention; and FIG. 6b is a detailed view of encircled area b of FIG. 6a.

FIG. 7 illustrates a drawer or pull handle according to the invention.

FIG. 8a is a perspective underside view of a latch with an isolation groove of the present invention; FIG. 8b is a perspective view of the latch and its catch from their front sides.

FIG. 9a illustrates application of the hinge of the present invention for attachment of a door and a coplanar mount. FIG. 9b illustrates application of the hinge of the present invention for attachment of a lid to an orthogonal mount.

PRIOR ART—FIG. 1

The present invention relates generally to the attachment of plastic parts having broad contact surfaces. The invention will first be described for the attachment of the leaves of a plastic hinge to its hinged members.

Prior to discussing the present invention, it is useful to note the prior art and its disadvantages. A conventional prior-art metal hinge and its attachment means are illustrated in FIG. 1. Hinge 10 serves for pivotally interconnecting hinged members or parts 12 and 14, which may be, e.g., a transparent plastic box and its transparent plastic door or lid. Hinge 10 comprises two flat plates or leaves 16 and 18; these are connected pivotally to each other by a pinion or pivot pin 20. Pin 20 is inserted into aligned holes in a knuckle or barrel 22 which comprises coaxially arranged knuckle sections, cylinders, or guideways which are alternatingly-integral with respective leaves 16 and 18 in conventional fashion. According to existing practice, leaves 16 and 18 are attached to hinged parts 12 and 14, respectively, by means of metal fasteners, such as screws 30. For this purpose, holes 32 are drilled or formed in each leaf, and threaded holes (not shown), which are aligned with holes 32, are tapped in corresponding parts 14 and 16.

Since fasteners 30 and hinge 10 are made of metal, the assembly is heavy, non-transparent, presets a corrosion problem, and the hinge clashes aesthetically when colorless plastic is used for hinged parts 12 and 14. Besides, drilled or tapped holes and fasteners weaken the plastic hinged parts and serve as a source of stress concentration. They also can collect debris, bacteria, and oil—undesirable factors when the hinge is to be used for food or medical applications. The attachment with screws and the formation of tapped holes is a time-consuming and expensive operation. Since hinge 10 is made of metal, its parts which rub together require oil to prevent squeaking. Such oil provide many hygienic disadvantages if the hinges are used in clean applications, such as laboratories, kitchen, etc.

As stated, plastic hinges with metal fasteners would have most of the foregoing disadvantages and additional potential fracture problems due to stress concentration from screws 30. While plastic hinges attached by the conventional solvent method (described below) would theoretically eliminate most of the above disadvantages, they would add additional disadvantages of unsightness due to irregular solvent flow and possible bonding of the hinge barrel if uncontrolled solvent reached such barrel. Insofar as I am aware, plastic hinges have not been used, ostensibly for those reasons.

ALL-PLASTIC HINGE—FIG. 2

An all-plastic hinge of the present invention is shown in FIG. 2 in an assembled state. The hinge consists of two generally-flat leaves 36 and 38 and a pivot pin 50. All parts are molded, e.g., from acrylic or similar plastic material. Each leaf comprises two integral, spaced barrel or knuckle sections or portions. Leaf 36 has a relatively long intermediate section 44 and a relatively short end knuckle section 45. Leaf 38 has similar long and short knuckle sections 46 and 47 which mutually interfit with knuckles sections 44 and 45 as shown. I. e., the space betewen knuckle portions 44 and 45 of leaf 36 is dimensioned such that the large knuckle portion 46 of leaf 38 can be tightly but movably inserted into this space. Similarly the space between knuckle portions 46 and 47 of leaf 38 receives large knuckle portion 44 of leaf 36. The use of a large intermediate knuckle section and a small end knuckle section on each leaf provides optimal support for the end portions of the leaves. The knuckle of both leaves are pivotally connected to each other in the asembled state by a pivot pin 50 which is a plain cylinder except that it has tapered-down ends for ease of insertion. Pin 50 may be inserted and held by friction fit, or it may be solvent-cemented to the knuckles of one leaf if it is to be retained more securely.

According to the invention, each of leaves 36 and 38 has a channel, groove, or moat, 52 or 54, respectively, on its mating surface, i.e., on its surface which faces up in FIG. 2 and which faces and contacts its respective hinged member (e.g., 12 and 14 of FIG. 1). Each groove is generally C-shaped and has three straight sections which are respectively adjacent the three outer edges of the leaf, i.e., the three edges other than the edge with the knuckle. Each groove thus defines or creates generally C-shaped marginal portions 56 or 58, and inner land or support portions 60 and 62 of leaves 36 and 38, respectively. As shown in FIGS. 2, 4, 5, and 7, the marginal portions are continuous along the edge of the hinge leaves and have a uniform thickness. The purpose of grooves 56 and 58 is to isolate marginal portions 56 and 58 from land portions 60 and 62. The ends of the marginal portions are spaced from and do not extend to end knuckle sections 45 or 47.

The minimum depth of the grooves should be about 1.4 mm (55 mils) and their minimum width should be about 2 mm (80 mils). In one presently-manufactured embodiment of the invention, pivot pin 50 was 4.45 cm (1.750") long, and 3.6 mm (140 mils) in diameter and each hinge leaf was 3.2 mm /(0.125") thick, 22 mm (0.875") wide and 4.45 cm (1.750") long.

While the hinge of FIG. 2 is shown in an assembled state, it can be disassembled and reassembled in a very simple fashion. For disassembly, pin 50 is merely pushed out (assuming it has to been cemented in place) and the leaves 36 and 38 will separate. For assembly, the knuckle portions of the two leaves are interfitted as shown. The leaves are adjusted to align the holes in all four knuckle portions, whereupon pin 50, which has a moderate friction fit with said holes, can be inserted into and pushed through the holes in the knuckles.

ATTACHMENT OF HINGE—FIG. 3

FIG. 3 illustrates the attachment of the hinge to two plastic hinged members 64 and 66 so as to create a pivotal or hinged interconnection therebetween. The hinge is positioned so that its leaves 36 and 38 face and contact members 64 and 66 and so that the axis of its knuckles is aligned with and overlies the space between members 64 and 66. The hinge is held, either manually or with a suitable clamp, one or both leaves at a time, against member 64 or 66, or both. Then a small quantity of a suitable plastic solvent is manually injected, e.g., by a bottle 68 with a fine-tube outlet 69, or by a hypodermic syringe (not shown), under marginal portions 56 and 58 of respective leaves 36 and 38. Preferably tip 69 of bottle 68 is moved quickly around all three sides of each leaf while the solvent is being dispensed so as to disperse the solvent evenly around the marginal portions of the leaves.

Under capillary action, the solvent is quickly distributed in the microspace between marginal portions 56 and 58 of the leaves and the corresponding underlying mating surfaces of hinged members 64 and 66. In well-known fashion, the solvent injected between mating parts will partially dissolve the surface layers of such parts, whereupon, when the solvent evaporates, the parts will adhere to each other due to the pressure applied to the leaves. After maintaining leaves 36 and 38 under pressure against members 64 and 66 for a sufficient but brief time (about 1 minute), the attachment is complete and the pressure can be released.

According to the invention, grooves 56 and 58 prevent penetration of the bonding solvent to land or support surfaces 60 and 62, thereby restricting the spreading of the solvent only to marginal surfaces 56 and 58. As a result, the solvent will be uniformly distributed over the relatively small marginal areas, leaving no irregular traces or spots on inner portions 60 and 62. Even if the hinge is made of opaque plastic, grooves 56 and 58 are of great utility since they will block capillary flow of the solvent so as to prevent it from the knuckle portion, where it might "freeze" (bond) the knuckle. Since the ends of the marginal portions are spaced from ends 45 and 47 of the knuckle, solvent will be kept away from the knuckle.

The hinge may be made of a composite plastic material, provided one of the materials is solvent-cementable. The hinge of the invention can be attached to plastic parts made in part of an insoluble materials. Preferred combinations of materials are acrylic plastic and nylon, ABS and acetal, and PVC and polytetrafluoroethylene. However dozens of other combinations are possible.

The most common solvents used for bonding are: methylene chloride, ethylene dichloride, tetrahydrofuran, methyl ethyl ketone (MEK), trichloroethylene, dichlorobenzene, toluene, xylene, etc.

HINGE WITH ELEVATED MARGINS—FIG. 4

Another embodiment of a hinge 78 of the present invention is shown in FIG. 4. Instead of the grooves, in this modification the mating face portions 82 and 84 of corresponding leaves, except margins 56 and 58, are removed or recessed, whereby margins 56 and 58 are slightly elevated from the rest of their leaves' face. Also all knuckle portions are of equal length.

When the hinge is placed against the parts to be hingedly attached, only the elevated margins will be in contact with such parts. Thus the solvent will be restricted to the marginal portions, as in the embodiment of FIG. 3. While this embodiment does not require a groove, it does have large pockets under the leaves so that dust and moisture may collect in these pockets.

Also since the knuckle sections are of a uniform size, the end knuckle sections will be relatively large, thereby providing a relatively large unsupported area of each hinge leaf, e.g., at portion 83. For the foregoing reasons this embodiment is applicable for less critical designs.

HINGE WITH COMPOSITE MARGIN—FIG. 5

In case the plastic hinge is made of a material which is incompatible for solvent cementing with the material of the members being connected by the hinge, hinge 70 of FIG. 5 may be employed. In this case the marginal portions of the hinge's leaves are covered with an intermediate material 72 (shown shaded) which is compatible with both the hinge and the members to which it is attached. For example, when the hinged members are made of acrylic and hinge 70 is molded from nylon, intermediate layer 72 may comprise acrylic, a substance which can be bonded by contact cement or dovetail molding to nylon. Thereupon the nylon hinge will have acrylic margins so that it can be solvent bonded to acrylic hinged members. The height of the marginal portions underlying intermediate layer 72 is reduced so that the composite marginal portion will have the same height as inner lands 60 and 62. Alternatively, lands 60 and 62 can be removed in favor of recesses such as 82 and 84 of FIG. 4. The method of application of the solvent, the principle of the groove's action, and the method of attachment of the hinge to the hinged members are the same as in the embodiment of FIGS. 2 and 3.

PIANO HINGE—FIG. 6

FIG. 6A illustrates a piano-type hinge 88 made of a plurality of individual hinges of the type shown in FIG. 2. Piano hinges are used for hinged attachment of long members to prevent warping, provide aesthetic appeal, prevent stresses, reduce alignment problems, etc. Piano hinge 88 consists of a plurality of eight separate hinges arranged in series with overlapping pins as shown on the larger scale of FIG. 6B. The piano hinge is assembled by pushing the pivot pin of each hinge slightly out of its knuckle so that it extends therefrom slightly at one end of the knuckle, as shown at 104 (FIG. 6B), and so that a recess is provided at the other end of the hinge, as shown at 102. The whole unit is then assembled, with the extending pin of each hinge extending into the recess of the next hinge so that each pin overlaps and extends into the knuckles of two hinges, thereby to provide strength and alignment, as in a conventional piano hinge with a single pin. The extending portion of the last hinge's pin is then cut off and inserted into the recess of the first hinge so that the piano hinge will have smooth ends.

PLASTIC PULL HANDLE—FIG. 7

Although the principle of the present invention has been described with regard to hinges, it should be understood that it has a broader application in that it can be used for permanently connecting any plastic or solvent-dissolvable parts with broad surface areas of contact. FIG. 9 illustrates a plastic drawer or pull handle 110 which is provided with an attachment portion 112 which is bonded to a cover, door, drawer, or any other suitable part (not shown) for which the transparency and appearance of the connection is importnt. The bottom surface of support portion 112 is provided with a continuous groove or moat 114 which separates a marginal peripheral portion 114 from a central support portion 116. In the process of bonding by a solvent, groove 114 fulfills the same barrier role for the solvent as in embodiments described above.

ATTACHMENT OF LATCH—FIG. 8

FIG. 8a is a bottom view of a latch 118 and FIG. 8b is a top view of latch 118 and its catch 132. Latch 118 has, on its attachment surface 20, a continuous isolating groove 122, similar to the groove in the embodiments described above. Groove 122 divides attachment surface 20 into a marginal portion 124 and a land portion 126. Latch 118 is permanently attached to a pivoting door or the like (not shown) in the same manner as has been described before with regard to the plastic hinge. The extending feet portions of latch 118 extend free or beyond the edge of the door. Catch 132 is attached to the door frame with solvent. Catch 132 has two extending pins, one of which is shown at 131, which snap into recesses 128 and 130 in the foot portions of latch 118 when the door is closed.

ATTACHMENT OF DOOR TO COPLANAR WALL—FIG. 9a

FIG. 9a illustrates application of a hinge 134 of the present invention for attachment of a door 142 to a coplanar wall 137 of a box 138 or the like. One leaf 136 of hinge 134 is attached to wall 137 and another leaf 140 is attached to door 142. It is understood that wall 137, baffle 142 and hinge 134 are made of suitable plastic materials and the hinge leaves are provided with isolating grooves of the previously-disclosed type. Door 142 is opened by rotating it in the direction of arrow D.

ATTACHMENT OF LID TO ORTHOGONAL MOUNT—FIG. 9b

FIG. 9b illustrates application of a hinge 148 of the present invention for pivotally attaching a lid 144 to an orthogonal mount vertical wall 152, e.g., of a box. In general this embodiment is similar to that of FIG. 9a. During attachment of leaf 146 to lid 144 and of leaf 150 to wall 152, measures should be taken to prevent bonding of leaf 146 to the upper edge of wall 152 when solvent is injected under said leaf's surface. This will normally can be accomplished by using only the necessary quantity of solvent since the end of the marginal portion of the leaf is spaced from the knuckle of the leaf. Normally lid 144 is in a horizontal position and is opened by rotating it upward in the direction of arrow E. The attachment of hinge 148 is performed in the same manner as has been described before.

Thus it has been shown that the present invention provides a means for attaching together—reliably, quickly, economically, and aesthetically—plastic parts with broad contact surfaces. The attachment is free of metal fasteners, rivets or similar elements which may act as stress concentrators and which at the same time are aesthetically inconsistent with the clarity of colorless plastic.

It is obvious that many other modifications of the attachment according to the present invention are possible. For example, apart from hinges and handles, the same principle can be applied for connecting nameplates, decorative elements, etc. The mating surfaces may have curved surfaces which conform to each other. Other materials apart from those described and mentioned in the application can be used for parts being connected, and other solvents can be utilized. In lieu of a single groove or moat as shown in the embodiment of FIG. 2, a plurality of concentric C-shaped grooves can be provided for aesthetic purposes; only the outermost groove will function to limit solvent penetration. The bonding surface can have any shape so long as there is a relatively narrow and raised or isolated bonding portion at its edge. Also the entire face of the hinge can be flat and the marginal portion can be isolated—i.e., solvent can be restricted to said marginal portion—by making the inner portion or coating it with a material which is not wettable or non-dissolvable by the solvent, e.g., by a grease, wood inlay, metal inlay, non-dissolvable plastic, etc. Therefore the scope of the invention should be determined, not by the examples given, but by the appended claims and their legal equivalents.

I claim:

1. A part which can be solvent bonded to a member having a flat mating surface which is dissolvable by a predetermined solvent, characterized in that:
   (a) said part has at least one relatively broad surface,
   (b) said relatively broad surface of said part has an outer edge,
   (c) said relatively broad surface of said part also has a relatively narrow marginal portion which is adjacent said outer edge thereof and which has a continuous flat upper surface which to be bonded to said flat mating surface of said member,
   (d) said relatively broad surface of said part also has a remaining portion which is separated from said outer edge by said relatively narrow marginal bonding portion and which is to remain unbonded to said member,
   (e) the upper surface of said relatively narrow marginal portion of said part is also dissolvable by said predetermined solvent,
   (f) said relatively narrow marginal portion of said part extends substantially continuously along said outer edge and has a uniform thickness, and
   (e) said part includes a moat for blocking capillary action flow of said predetermined solvent and thereby preventing said predetermined solvent from flowing over said remaining portion of said relatively broad surface of said part when:
      (1) said broad surface of said part is adjacent said flat mating surface of said member such that said flat upper surface of said narrow marginal portion of said part and said flat mating surface of said member are in parallel planes and in overlying engagement, and
      (2) said solvent is applied from the outside of said part and said member along said outer edge to the contacting surfaces of said part and said member.

2. The part of claim 1 wherein said moat comprises a groove in said broad surface of said part, said groove defining and isolating said marginal portion.

3. The part of claim 1 wherein said moat comprises the remaining portion of said broad surface of said part, said remaining broad surface being lower in height than said narrow marginal portion thereof.

4. The part of claim 1 wherein said part comprises a first leaf of a two-leaf hinge.

5. The part of claim 4, further including a mating second leaf so as to provide a two-leaf hinge, said mating leaf being hingedly interconnectd to said first leaf, said second leaf being similar to said first leaf and containing said moat on its relatively broad surface.

6. The invention of claim 5 wherein each of said first and second leaves has a plurality of tubular knuckle sections, one knuckle section at the end of each leaf being shorter than at least one other knuckle section thereon.

7. The invention of claim 5 further including a second two-leaf hinge, each hinge being formed of a plurality of hingedly-interconnected leaves, each leaf having at least one knuckle portion, said tubular knuckle sections of all leaves being aligned with each other, and at least one pivot pin extending from one end of a knuckle portion of one hinge into the knuckle portion of an adjacent hinge so as to hold said knuckle portions in alignment and to provide a pivot axis, thereby to form a piano hinge, each leaf of each hinge having said means on its relatively broad surface.

8. The part of claim 1 further including grasping means on a surface thereof opposite said relatively broad surface thereof, thereby to provide a drawer pull, said moat extending entirely around the edge of said relatively braod surface thereof.

9. The invention of claim 1 further including means on a surface thereof other than its relatively broad surface for receiving and holding a springloaded plunger, said moat extending entirely around the edge of said relatively broad surface thereof, thereby to provide a latch catch.

10. A plastic hinge which can be solvent bonded to a pair of members which are to be hingedly interconnected and which have flat hinge attachment surfaces which are dissolvable by a predetermined solvent, characterized in that:
   (a) said hinge comprises two pivotably interconnected flat hinge leaves, each leaf having at least one relatively broad surface for interconnection to a respective one of said hinge attachment surfaces of said members,
   (b) said relatively broad surface of each leaf has at least one outer edge,
   (c) said relatively broad surface of each leaf also has a relatively narrow marginal portion which is adjacent said outer edge and which has a continuous flat upper surface which is to be bonded to said flat hinge attachment surface of a respective one of said said members, (d) said relatively broad surface of each leaf also has a remaining portion which is separated from said outer edge by said relatively narrow marginal bonding portion and which is to remain unbonded to said one of said members, (e) said flat upper surface of said relatively narrow marginal portion of each leaf is also dissolvable by said predetermined solvent, (f) said relatively narrow marginal portion of each leaf extends substantially continuously along said outer edge and has a uniform thickness, and (g) each of said leaves includes a moat for blocking capillary action flow of said predetermined solvent and thereby preventing said predetermined solvent from flowing over said remaining portion of said broad surface thereof when:

(1) said broad surface of said leaf is adjacent said flat hinge attachment surface of said member such that said flat upper surface of said narrow marginal portion of said leaf and said flat hinge attachment surface are in overlying engagement, and (2) said solvent is applied form the outside along said outer edge to the contacting surfaces of said leaf and said member.

11. The hinge of claim 10 wherein said moat comprises a groove in said relatively broad surface of each leaf, said groove defining said marginal portion.

12. The part of claim 11 wherein said groove is at least about 1.4 mm deep and at least about 2 mm in width.

13. The part of claim 10 wherein said moat comprises the remaining portion of said broad surface of each leaf, said remaining portion being lower in height than said narrow marginal portion thereof.

14. The invention of claim 10 wherein each of said leaves has a plurality of tubular knuckle sections, one knuckle section at the end of each leaf being shorter than at least one other knuckle section thereon.

* * * * *